Oct. 14, 1924.   1,511,960
R. GOLDSCHMIDT
PROPULSION OF VEHICLES
Filed July 16, 1921    3 Sheets-Sheet 1

Witnesses:
Emil Kayser
Robert Schaper

Inventor:
Rudolf Goldschmidt
by Watson, Coit, Morse & Grindle,
Attorneys.

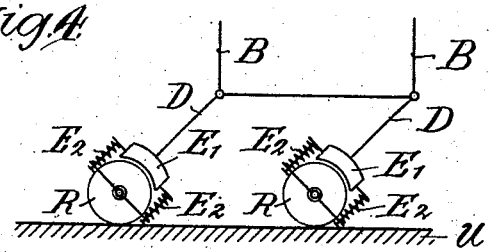
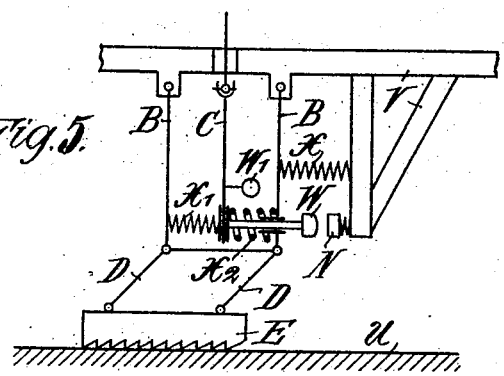
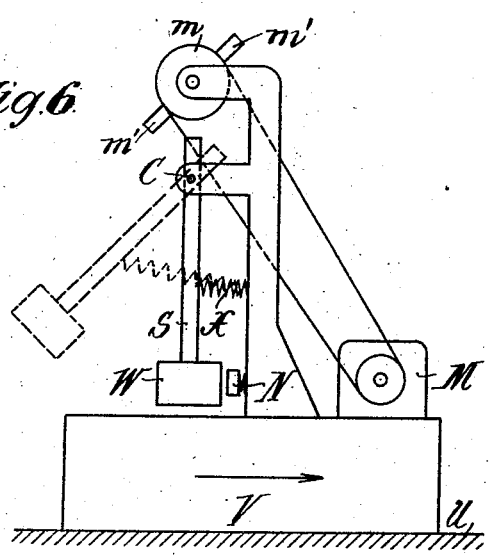

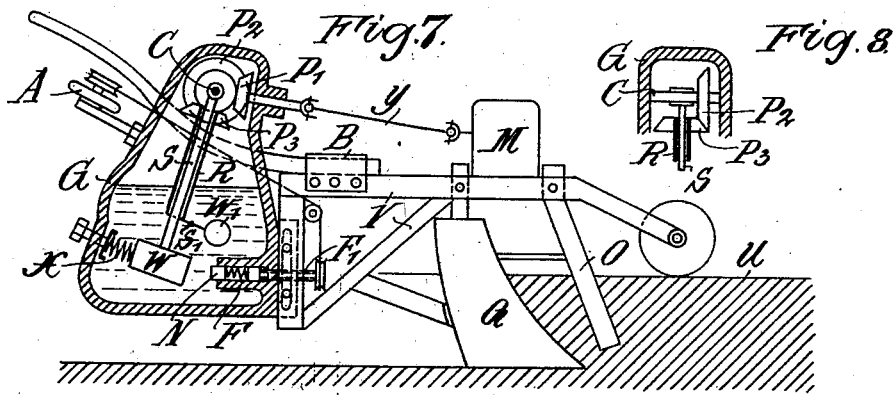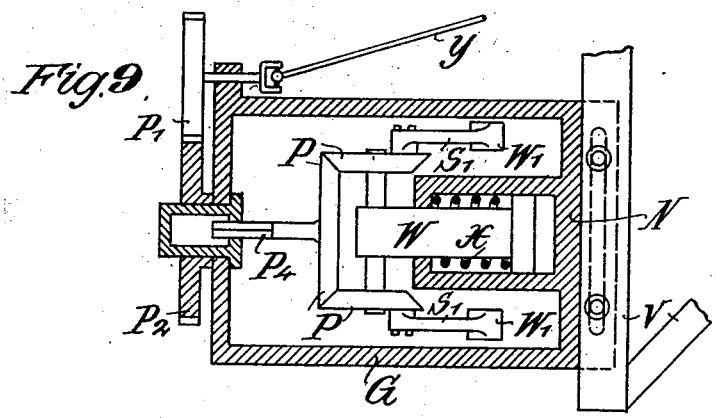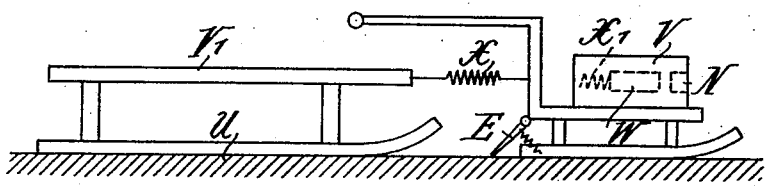

Patented Oct. 14, 1924.

1,511,960

UNITED STATES PATENT OFFICE.

RUDOLF GOLDSCHMIDT, OF BERLIN, GERMANY, ASSIGNOR TO DET TEKNISKE FORSØGS-AKTIESELSKAB, OF ORDRUP, CHARLOTTENLUND, DENMARK, A COMPANY OF DENMARK.

PROPULSION OF VEHICLES.

Application filed July 16, 1921. Serial No. 485,374.

*To all whom it may concern:*

Be it known that I, RUDOLF GOLDSCHMIDT, a citizen of Germany, and a resident of Berlin, Germany, have invented certain new and useful Improvements in the Propulsion of Vehicles, of which the following is a specification.

This invention relates to the propulsion of vehicles by means other than adhesion between driving wheels and a track or road surface, and is applicable to vehicles for travelling upon ice and snow or to sledges where the adhesion is very small or to vehicles which are required to do considerable work in addition to overcoming their own friction, such as locomotives, vehicles on steep inclines or portable machines such as agricultural ploughs, harrows, street sweeping machines, snow ploughs and the like.

According to the present invention the mechanism for the propulsion of a vehicle of the type above referred to comprises a reciprocatory member, such as a pendulum or hammer, movably connected to the vehicle and means for repeatedly and in rapid succession oscillating said member to cause the same to propel the vehicle by frequent forward impulses transmitted in rapid succession to the vehicle, preferably through the medium of a resilient buffer or spring.

The present invention is an adaptation of the mechanism described in my prior United State Patents Nos. 1,386,329 of 2nd August, 1921 and 1,452,038 of April 17, 1923 and in my applications for patents Serial Nos. 461,446 filed 14th April, 1921 and 479,573 filed 22nd June, 1921.

Fig. 4 is a side view illustrating a modified arrangement of the mechanism shown in Fig. 1 and Fig. 5 illustrates a further modification thereof.

Fig. 6 is a side view illustrating the application of the invention to a semi-portable vehicle.

Fig. 7 is a side view partly in section showing the application of the invention to an agricultural plough.

Fig. 8 is a fragmentary view at right angles to Fig. 7 showing the driving gear.

Fig. 9 is a fragmentary horizontal section showing a modified driving arrangement for the plough shown in Figure 7.

Fig. 10 illustrates my invention applied to connected vehicles.

Figure 1:
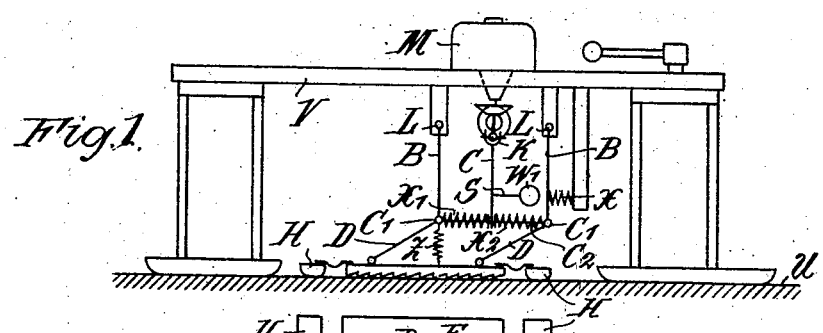
Fig. 1 illustrates the present invention applied to a sledge, shown in side view.
Figure 3:
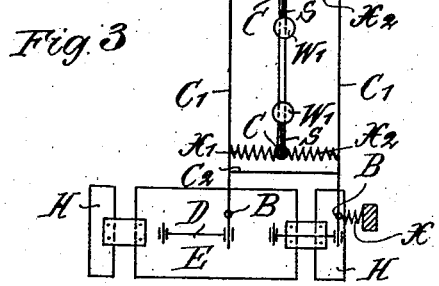
Fig. 3 is a diagrammatic plan view with the upper part of the sledge removed to show the driving mechanism.
Figure 2:
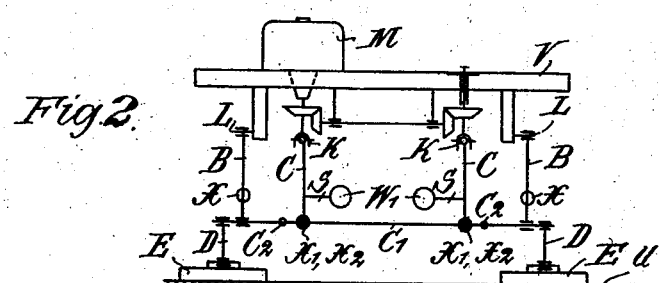
Fig. 2 is a front view of the vehicle shown in Fig. 1

Referring to Figs. 1, 2 and 3 which show the invention applied to a sledge, a motor M mounted on the sledge V drives a pair of vertical shafts C through suitable gearing. The shafts C each carry an arm S having a weight $W^1$ and have a universal joint at K so as to be capable of swinging. The lower ends of the shafts C are connected to a frame $C^1$, $C^2$ suspended from hangers B journaled at L. Rotation of the weights $W^1$ thus effects oscillation of the frame $C^1$, $C^2$ and hangers B. The weights $W^1$ are preferably rotated at equal angular velocities but in opposite directions so as to eliminate forces at right angles to the direction of movement of the sledge.

It will be understood that any form of driving mechanism for the weights $W^1$ may be employed.

The hangers B are jointed to shoes F by means of inclined struts D and control springs Z, the latter determining the maximum relative movement between the parts. The shoes E are roughened or formed with any other suitable under-surface (such as wood, rubber, leather or the like) so as to firmly grip the road surface U on the outswing of the hangers B towards the left, whilst motion of the hangers B towards the right will cause the shoes to ride over the road surface. The riding of the shoes may be facilitated by fitting them with resilient skids H. The front hangers B are connected to the frame work of the vehicle V through springs X.

The system B, D, E thus produces the required inequality of resistance to movement during forward and return motion by reason of the pressure of the springs X.

Fig. 4 illustrates a modified arrangement for retarding return movement. In this case the struts D carry brake blocks $E^1$ which act upon rollers R preferably against the action of springs $E^2$. Backward movement of the rollers R is thus resisted by gliding friction between the rollers and road surface, whilst the rollers are free to revolve for forward movement. In the application of the invention to wheeled vehicles, the arrangement may be the same, the sledge runners being replaced by wheels.

In Figs. 1 and 2 there are really two pendulum systems with two shoes E and two springs X but it will be understood that any number thereof may be employed. It may be desirable to cause the shoes to work in alternation to one another, so as to render the propulsion more uniform. The varying forces in the several springs X due to the alternate working of the shoes will be additive and thus produce a constant total force. The connection between the lower ends of the shafts C and the frame bars C¹ may be either a rigid connection or (as shown) it may consist of resilient members or springs X¹ and X².

The propulsive force need not necessarily be transmitted from the pendulum system to the vehicle by the simple action of a spring X. The transmission may also be effected by impact. Fig. 5 shows a modification wherein the propulsion is effected both by pressure and impact. In this example, whilst the shoe E is stationary, the spring X¹ is compressed by the pendulum system and on the reverse movement thereof, a plunger W is projected forward and imparts its energy to the vehicle V by impact against a resilient buffer N, the buffer N being preferably resilient in order to mitigate the blow.

In Figs. 1, 2 and 3, the pendulum system is illustrated as adapted to swing about journals L. The function of the apparatus will however not differ if the oscillating system is mounted so as to oscillate in horizontal guides as in Fig. 9.

In certain instances it is not essential that the vehicle should be propelled at a constant velocity. The velocity may even vary to such an extent that it periodically becomes zero or a negative quantity. In such case the shoes E may be dispensed with. Fig. 6 is an illustration of this nature. The vehicle is represented by a body V which rests upon a foundation U. The body V supports a pendulum or hammer W which is carried by an arm S pivoted in a journal C. When the hammer W is raised into the inclined position indicated by dotted lines and then allowed to return under the action of gravity and the spring X, a blow will be imparted to the body V through the buffer N. The blow may also in this case be mitigated by making the buffer N resilient as shown. This impact causes the body V to move towards the right in the direction of the arrow. This movement of the body towards the right is contingent upon there being sufficient friction between the body V and its support U. If the friction is considerable, the accelerating and retarding forces, required to control movement of the hammer, with corresponding slow movement of the body V, may be reduced to such an extent that they are comparatively small as compared with the friction between the body V and its support U. In Fig. 6 the mechanism for actuating the hammer is diagrammatically illustrated as including a motor M driving a pulley $m$ and tappets $m^1$ adapted to strike the upper end of the hammer shaft S.

Figs. 7 and 8 illustrate the application of the invention to an agricultural plough in which O represents the front cutter and Q the plough share. In this instance the cutter and plough share remain in the earth and consequently constitute a comparatively large resistance to backward movement of the frame V of the plough. The frame V adjustably supports a casing G which encloses the driving hammer and may simultaneously form an oil chamber. A motor M mounted on the frame V drives a shaft Y and gearing P¹ P² through universal joints, the gear wheel P² being mounted on a shaft C on which is journaled an arm S supporting the hammer W. The gear wheel P² gears with a bevel wheel P³ at the upper end of the sleeve R the lower end of which carries an arm S¹ and weight W¹, the latter being thus rotated about the hammer shaft S. The hammer W is connected to the casing by a spring X. It will of course be understood that a plurality of rotating weights W¹ may be provided but the arrangement must be such that the backward pressure of the hammer W through the spring X upon the casing G is not sufficient to draw the plough out of the earth. The hammer W in its forward movement is adapted to strike against a fixed or resilient buffer N. In this case the buffer N is shown fitted with a spring F through the medium of which the blow is transmitted to the plough. The blow imparted to the plough will overcome the resistance to movement thereof and will also automatically adapt itself to this resistance inasmuch as the force of the blow will be increased in proportion to the resistance which the buffer N and plough provide against forward motion. The impact can be regulated by varying the compression of the spring F by means of a screw F¹ and cable control leading from a hand wheel A or in any other suitable manner so that more or less of the impact will be absorbed.

The hand bars for guiding the plough will preferably be slidably mounted on the frame V such as within sleeves B so that the frame V and hand bars are capable of relative movement in the direction of the ploughing operation.

Fig. 9 illustrates a modification of Fig. 7 wherein a part N of the wall of the casing G forms a fixed buffer for the hammer W which is driven by rotating weights W¹. The weights W¹ are carried by rotatable arms S¹ driven by means of bevel wheels P, a square shaft P⁴ and gearing P¹ P² from a universally jointed shaft Y. The hammer thus moves in a straight line within the casing G.

Instead of the spring X being connected to the hammer W and casing G as in Fig. 7, the spring X in Fig. 9 is interposed between a collar on the hammer X and the end of a housing which is carried by the casing G and encloses the spring.

Fig. 10 shows a sledge V¹ to which a substantially uniform velocity is to be imparted and which is connected by resilient connection X with a leading sledge V, the velocity of which may vary from its maximum to zero. The leading sledge V carries the driving mechanism X¹, W and N which may be of the form shown in Fig. 9. The leading sledge is provided with spurs E adapted to dig into the ice and operates otherwise in a similar manner to the sledge described with reference to Figs. 1 to 3.

Claims:

1. Mechanism for the propulsion of a vehicle other than by adhesion between driving wheels and a track or road surface comprising an oscillatory member, a connection therefrom to the vehicle permitting oscillatory movement of the member, mechanism for repeatedly and in rapid succession oscillating said member and an abutment on the vehicle for said member, whereby frequent forward impulses are transmitted in rapid succession to the vehicle.

2. Mechanism as specified in claim 1 having a resilient abutment on the vehicle.

3. In a vehicle propelled other than by adhesion between driving wheels and a track or road surface, a pendulum hung at its upper end to the vehicle, centrifugal mechanism connected to said pendulum, means for driving said mechanism to oscillate said pendulum in frequent and rapid succession and means whereby said pendulum imparts frequent forward impulses in rapid succession to the vehicle.

4. Mechanism as specified in claim 1 in which the oscillatory member comprises a pendulating frame hung from the vehicle body, centrifugal mechanism connected to said frame, and means for driving said centrifugal mechanism to oscillate said frame in frequent and rapid succession.

5. Mechanism as specified in claim 1 having a spring connecting the oscillatory member to a point on the vehicle in front thereof.

6. In a vehicle propelled other than by adhesion between driving wheels and a track or road surface, the combination with mechanism as specified in claim 1 of ground-engaging devices for arresting the backward stroke of the oscillatory member.

7. A vehicle as specified in claim 3 having ground-engaging devices connected with the lower end of the pendulum to arrest the backward stroke thereof.

8. A vehicle propelled other than by adhesion between driving wheels and a track or road surface comprising the combination of vertical bars hung at their upper ends to the vehicle body, a framework connecting the lower ends of said bars, a vertical shaft, a connection between the lower end of said shaft and the framework, a universal joint at the upper end of said shaft, means for rotating said shaft, an arm projecting from said shaft, a weight on said arm, a spring connecting the front of said framework to a point on the vehicle body, rearwardly-inclined struts jointed to said framework and ground-engaging devices supported by said struts.

In testimony whereof I hereunto affix my signature.

RUDOLF GOLDSCHMIDT